March 25, 1941.　　A. S. VILLASUSO　　2,236,202
CLARIFYING APPARATUS FOR SUGAR CANE JUICE AND OTHER SUGARY PRODUCTS
Filed Jan. 5, 1939
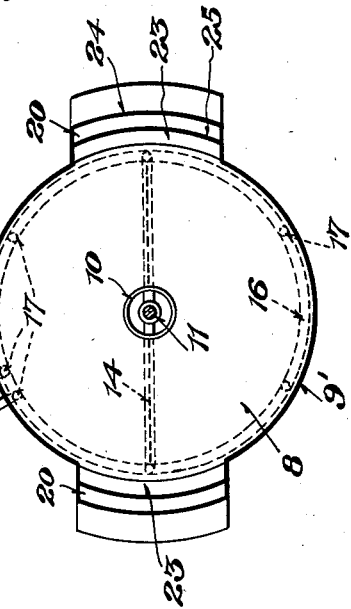
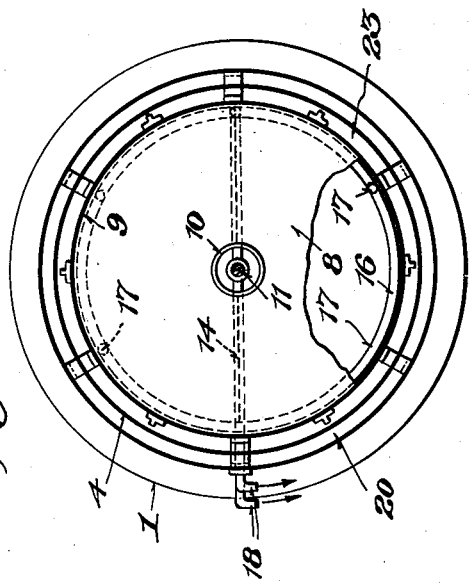
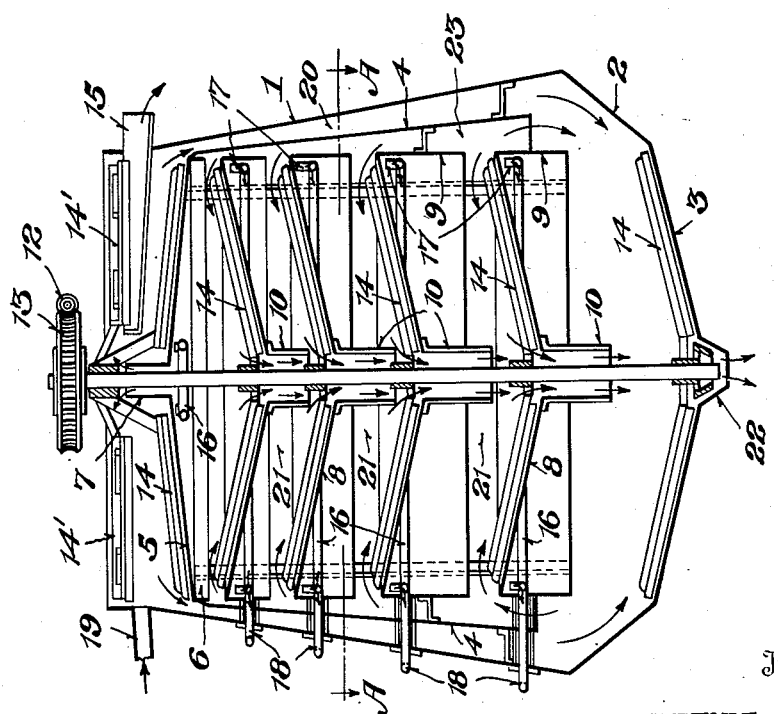
Inventor
Armando S. Villasuso,
By Wilkinson & Groff
Attorneys Patented Mar. 25, 1941

2,236,202

UNITED STATES PATENT OFFICE 2,236,202

CLARIFYING APPARATUS FOR SUGAR CANE JUICE AND OTHER SUGARY PRODUCTS

Armando S. Villasuso, Ingenio Concepcion, Tucuman, Argentina

Application January 5, 1939, Serial No. 249,537
In Argentina October 31, 1938

3 Claims. (Cl. 210—55)

This invention relates to improvements in clarifying apparatus for sugar cane juice and other sugary products, and has for its main object the application thereto of certain improvements providing evident advantages over all other devices and apparatus which have been proposed and used heretofore for the same purpose.

Some types of clarifiers are known, which are provided with a plurality of working compartments formed by trays suitably offset on a vertical axis, on which slide driving blades having a slow rotary motion. In some of these clarifiers, the juice to be treated falls to the bottom of the corresponding tank, where through the action of the fall itself, generally from a considerable height, it suffers an intensive stirring and in such condition it reaches the respective trays. Due to the fact that the substances in suspension in the liquid are thoroughly mixed with each other, in order to obtain a perfect clarification it is necessary to keep the juice thereon for a certain period of time until the material to be separated has settled completely.

In other instances, the juice to be clarified is passed into the clarifier through the upper compartment, from which it is poured in a stepped manner to the successive lower compartments, but this method, in actual practice, has failed to attain the required results, as during the passage thereof from one tray to another, said liquid also suffers a stirring which is undesirable for the subsequent sedimentation.

In order to obviate these drawbacks, the new type of clarifier subject of the present invention has been devised, which due to its excellent constructive and operative features, is particularly adapted for the clarification of sugar juices extracted from the cane, as well as beet juices and other sugary products.

The invention also contemplates other objects which will be understood from the course of the following specification.

In order that the invention may be more clearly understood and readily carried into practice, same has been illustrated by way of example and in a preferred embodiment in the accompanying drawing, wherein—

Figure 1 is a vertical sectional view of the new type of improved clarifier.

Figure 2 is a horizontal sectional view of the same clarifier, taken on the line A—A; and Figure 3 is a horizontal sectional view of a modification of the same clarifier.

The same reference characters indicate like or corresponding parts throughout the different figures.

In the form of construction shown in Figures 1 and 2, the new type of clarifier subject of the present invention comprises mainly a deposit tank 1, substantially of frusto-conical shape and with the diameter thereof increasing towards its lower portion. Said tank 1 has the lower end thereof closed by a bottom constituted by two casing portions 2 and 3, also frusto-conical and having a decreasing base.

Within said tank is concentrically arranged an annular element 4 which is flared towards its lower open base, and the upper base of which is covered by a cover 5 mounted thereon by means of a flange 6 or any other suitable means, and the central slightly up-raised portion thereof is provided with a tubular mouth 7, for the purpose which will be explained hereinafter.

In the interior of the assembly just described are mounted a plurality of trays 8, arranged parallel to each other and suitably spaced, forming the different working compartments. Each of said trays is of frusto-conical shape, with the apex towards the bottom, and the periphery thereof is provided with a depending cylindrical flange 9 which is kept at a suitable distance from the tubular body 4, while the central portion of said tray has adapted thereto or formed therewith a tubular conduit 10, extending downwardly and partially entering into the adjacent trays.

Axially extending through the conduits 7 and 10 is a vertical shaft 11 which receives a slow rotary motion by means of a suitable mechanism constituted, for example, by the worm 12 and worm wheel 13, the latter being suitably fixed to the upper end of said shaft.

The figures also show that on said shaft 11 are fixed a number of radial blades 14, acting as scrapers on the upper face of each tray 8 as well as on the cover 5 and bottom 3 of the tank 1. The upper portion of said tank is provided with a further series of similar blades 14' acting on the corresponding foam and facilitating the discharge thereof through the channel 15.

In turn, beneath each tray 8 is provided an annular conduit 16 from the upper portion whereof extends upwardly a plurality of small intake nozzles 17 opening into the angles formed by said tray and the corresponding flange 9. Said nozzles act as extractors for the clear juice, which is carried out of the tank through tubular conduits 18 which may be connected, if desired, to a common extracting tube. An extractor similar to that just described is arranged underneath the upper cover 5.

The operation of this type of clarifier is very simple and takes place in the following manner:

The liquid to be clarified enters the tank 1 through the upper conduit 19, falling into the chamber 20 formed between the wall of said tank 1 and the internal body 4, and the solid or semisolid matter which may accumulate on the cover 5 is moved into the chamber through the action of the upper scraping blades 14. The passage of juice and other substances to the lower part of the tank is effected in such a manner that the stirring caused when striking the bottom thereof is minimized, due to the fact in their downward motion said substances slide on inclined surfaces 4, 2 and 3, and are smoothly deposited on the lower portion thereof. Upon continuing the admission of liquid, same rises also without stirring through the internal portion of the tubular body 4, and will successively enter the annular spaces 21, formed between the free upper borders of each of the trays 8, and the lower border of the adjacent flanges 9, filling each of the trays. The juice is thus allowed to stand until a complete sedimentation has been obtained. In such condition, the heavier substances are deposited on the lower part of each tray, and once the juice has reached the desired degree of clarification, it is sucked through the intakes 17, and extracted through the tubular conduits 16 and 18. In turn, the residual sludge deposited on the trays 8 is eliminated through the central conduits 10, reaching the bottom 3 of the tank 1, from where it is finally discharged through the lower opening 22; the different scraping blades 14 cooperate in this elimination, by carrying said residue to the respective discharges.

Finally, the foam which for reasons of density is deposited on the upper portion of the tank 1, is eliminated through the overflow channels 15, towards which it is driven by the rotary blades 14'.

The tubular mouth 7 formed in the central part of the cover 5 allows the expelling of the air contained in the tank 1 during the filling thereof.

The modification shown in Figure 3 consists in that the two concentrical bodies 1 and 4 have been substituted by a single body 9' formed by junction of the flanges 9, in which case the chambers 20 and 23 for the lowering and raising of the juice to be clarified, are formed by means of radial enlargements 24, of oblique walls, formed in the walls of said body 9', and by an intermediate partition 25 which replaces the internal body 8 of the previous case.

The admission of the liquid to the corresponding trays is effected in this case by one or more mouths formed in the body 9', at the levels corresponding to said trays.

The operation, as explained above, is clear and requires no further details for those skilled in the art.

It is evident that several modifications in construction and detail may be introduced without departing from the scope of the present invention as clearly set forth in the appended claims.

What I claim is:

1. Clarifying apparatus for sugar cane juices and the like and including an outer casing having an inlet conduit and an outlet conduit at its upper end for the effluent juices, said casing having a closed lower end provided centrally with a sludge outlet, a series of decantation trays arranged in vertically spaced relation within said outer casing, said trays being all of the same diameter and of inverted frusto-conical form, a frusto-conical inner casing arranged in the space between the trays and outer casing and having a frusto-conical top provided with an upwardly extending and centrally disposed outlet tube, outlet tubes each extending downwardly from a respective tray at the center thereof, a shaft extending through said outlet tubes, scrapers carried by said shaft and extending over the trays, and means to drive said shaft.

2. Clarifying apparatus for sugar cane juices and the like, according to claim 1, wherein said shaft extends above and through the said centrally disposed outlet tube of the inner casing and scraper elements attached to the shaft above said outlet tube and traversing the upper surface of the top of the inner casing.

3. Clarifying apparatus for sugar cane juices and the like, according to claim 1, wherein the said closed lower end of the outer casing consists of a plurality of integral wall sections, one of said wall sections being of inverted steeply frusto-conical form and depending from the lower edge of the outer casing and another substantially centrally located wall section of inverted bluntly frusto-conical form including said sludge outlet, whereby the sludge on the said lower end of the outer casing first moves rapidly downwardly due to said first mentioned wall section and then moves slowly toward said sludge outlet due to said second wall section.

ARMANDO S. VILLASUSO.